(12) United States Patent
Resconi

(10) Patent No.: US 7,166,683 B2
(45) Date of Patent: Jan. 23, 2007

(54) PROCESS FOR POLYMERIZING 1-BUTENE AND 1-BUTENE POLYMERS

(75) Inventor: Luigi Resconi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/495,298

(22) PCT Filed: Nov. 8, 2002

(86) PCT No.: PCT/EP02/12731

§ 371 (c)(1),
(2), (4) Date: May 11, 2004

(87) PCT Pub. No.: WO03/042258

PCT Pub. Date: May 22, 2003

(65) Prior Publication Data

US 2004/0260040 A1     Dec. 23, 2004

(30) Foreign Application Priority Data

Nov. 12, 2001   (EP) ................... 01204317

(51) Int. Cl.
*C08F 4/52* (2006.01)
*C08F 4/76* (2006.01)
*C08F 10/08* (2006.01)
*C08F 110/08* (2006.01)
*C08G 61/04* (2006.01)

(52) U.S. Cl. ................... 526/161; 526/172; 526/348.6; 528/396

(58) Field of Classification Search ............. 526/348.6, 526/161, 160, 172, 170; 528/396
See application file for complete search history.

(56) References Cited

U.S. PATENT DOCUMENTS

| | | | | |
|---|---|---|---|---|
| 5,451,649 A | * | 9/1995 | Zenk et al. ................... | 526/160 |
| 5,770,664 A | * | 6/1998 | Okumura et al. ............ | 526/127 |
| 5,786,432 A | | 7/1998 | Küber et al. ................. | 526/127 |
| 5,932,669 A | | 8/1999 | Rohrmann et al. .......... | 526/160 |
| 6,180,732 B1 | | 1/2001 | Ewen ........................... | 526/127 |
| 2003/0008984 A1 | | 1/2003 | Kratzer et al. ............... | 526/127 |
| 2003/0069320 A1 | | 4/2003 | Minami et al. .............. | 521/142 |

FOREIGN PATENT DOCUMENTS

| | | |
|---|---|---|
| DE | 19917985 | 10/2000 |
| DE | 19962814 | 6/2001 |
| DE | 19962910 | 7/2001 |
| EP | 0172961 | 3/1986 |
| EP | 0537130 | 4/1993 |
| EP | 0633272 | 1/1995 |
| EP | 0775707 | 5/1997 |
| EP | 786 466 A1 * | 7/1997 |
| EP | 0786466 | 7/1997 |
| JP | 60262804 | 12/1985 |
| WO | 9102012 | 2/1991 |
| WO | 9200333 | 1/1992 |
| WO | 9532995 | 12/1995 |
| WO | 9902569 | 1/1999 |
| WO | 9921899 | 5/1999 |
| WO | 9945043 | 9/1999 |
| WO | 9952955 | 10/1999 |
| WO | 0121674 | 3/2001 |
| WO | 0147939 | 7/2001 |
| WO | PCT/EP0013191 | 7/2001 |
| WO | WO 01/47939 A1 * | 7/2001 |
| WO | 0162764 | 8/2001 |
| WO | 0216450 | 2/2002 |

OTHER PUBLICATIONS

A. Rossi et al., "End Groups in 1-Butene Polymerization via Methylaluminoxane and Zirconocene Catalyst;" *Macromolecules*, vol. 28(6), p. 1739-1749 (1995).
W. Kaminsky et al., "Homopolymerizations of α-Olefins with Diastereomeric Metallocene/MAO Catalysts;" *Macromolecules*, vol. 33(6), p. 1955-1959 (2000).
V. Buscio et al, "Regiospecificity of 1-butene polymerization catalyzed by C2-symmetric group IV metallocenes;" *Macromol. Rapid Commun.*, vol. 16, p. 269-274 (1995).
N. Naga et al, "Effect of co-catalyst system on α-olefin polymerization with rac- and meso-[dimethylsilylenebis(2,3,5-trimethyl-cyclopentadienyl)]zirconium dichloride;" *Macromol. Rapid Commun.*, vol. 18, p. 581-589 (1997).
C. J. Carman et al., "Monomer Sequence Distribution in Ethylene-Propylene Rubber Measured by $^{13}$C NMR. 3. Use of Reaction Probability Model[1];" *Macromolecules*, vol. 10, p. 535 (1977).

* cited by examiner

*Primary Examiner*—Ling-Sui Choi
*Assistant Examiner*—Rip A. Lee
(74) *Attorney, Agent, or Firm*—Jarrod N Raphael

(57) ABSTRACT

A process for polymerizing 1-butene, optionally with up to 30% by mol of ethylene, propylene or an alpha olefin of formula $CH_2=CHT$ wherein T is a $C_3$–$C_{10}$ alkyl group, in the presence of a catalyst system obtainable by contacting a metallocene compound having $C_1$ symmetry with an alumoxane and/or a compound capable of forming an alkyl metallocene cation.

14 Claims, No Drawings

PROCESS FOR POLYMERIZING 1-BUTENE AND 1-BUTENE POLYMERS

This application is the U.S. national phase of International Application PCT/EP02/12731, filed Nov. 8, 2002.

The present invention relates to a process for polymerizing 1-butene by using metallocene compounds and to the isotactic polybutene obtained thereby.

1-Butene polymers are well known in the art. In view of their good properties in terms of pressure resistance, creep resistance, and impact strength they have a lot of uses such as the manufacture of pipes to be used in the metal pipe replacement, easy-open packaging and films. The 1-butene (co)polymers are generally prepared by polymerizing 1-butene in the presence of $TiCl_3$ based catalysts components together with diethylalumninum chloride (DEAC) as cocatalyst. In some cases diethyl aluminum iodide (DEAI) is also used in mixtures with DEAC. The polymers obtained, however, generally do not show satisfactory mechanical properties. Furthermore, in view of the low yields obtainable with the $TiCl_3$ based catalysts, the 1-Butene polymers prepared with these catalysts have a high content of catalyst residues (generally more than 300 ppm of Ti) which lowers the properties of the polymers making it necessary a deashing step.

1-butene (co)polymers can also be obtained by polymerizing the monomers in the presence of a stereospecific catalyst comprising (A) a solid component comprising a Ti compound and an electron-donor compound supported on $MgCl_2$; (B) an alkylalurninum compound and, optionally, (C) an external electron-donor compound. A process of this type is disclosed in EP-A-172961 and more recently in WO99/45043.

In Macromolecules 1995, 28, 1739–1749 rac-dimethylsilylbis(4,5,6,7-etrahydro-1-indenyl)zirconiurm dichloride and methylaluminoxane have been used for polymerizing 1-butene, even if the yield of the process is not indicated the molecular weight of the polymer (Mn) is very low.

Recently metallocene compounds have been used for producing 1-butene polymers. In Macromol. Rapid Commun. 18, 581–589 (1997) rac and meso-[dimethylsilylenebis (2,3,5-trimethyl-cyclopentadienyl)]zirconium dichloride have been used for the polymerization of 1-butene. The yields of the process and the molecular weight of the obtained polymers are rather low.

More recently in Macromolecules 2000, 33, 1955–1956, $Me_2Si(2\text{-}Me\text{-}4,5\text{-}BzoInd)_2ZrCl_2$, $Me_2Si(2\text{-}Me\text{-}4\text{-}PhInd)_2ZrCl_2$ and $Me_2Si(Ind)_2ZrCl_2$ have been tested in the polymerization of 1-butene. Even if the molecular weights of the polymers appear to be quite high, the activities of these catalysts are low as shown in the comparative examples of the present application.

In WO 02/16450 it is described a 1-butene polymer endowed with a low isotacticity. This polymer is obtained by using a specific class of metallocene compounds having a double bridge. With the process of the present invention it is possible to obtain 1-butene polymers having a higher value of isotacticity or that do not meet all the parameters disclosed in this PCT application, by using completely different metallocene compounds.

A new process that permits to obtain 1-butene polymers with high molecular weight and in high yield is therefore desirable.

Thus, according to a first aspect, the present invention relates to a process for polymerizing 1-butene comprising contacting under polymerization conditions 1-butene, optionally from 0 to 30% by mol; preferably from 0 to 10% by mol of ethylene, propylene or an alpha olefin of formula $CH_2=CHT$ wherein T is a $C_3$–$C_{10}$ alkyl group, in the presence of a catalyst system obtainable by contacting:

(A) a metallocene compounds belonging to the following formula (I):

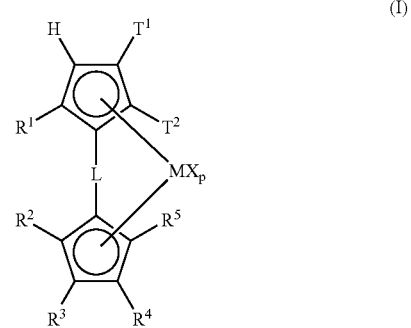

wherein:

M is an atom of a transition metal selected from those belonging to group 3, 4, or to the lanthanide or actinide groups in the Periodic Table of the Elements (new IUPAC version); preferably M is zirconium titanium or hafnium;

X, equal to or different from each other, is a hydrogen atom, a halogen atom, a R, OR, OR'O, $OSO_2CF_3$, OCOR, SR, $NR_2$ or $PR_2$ group wherein R is a linear or branched, saturated or unsaturated $C_1$–$C_{20}$-alkyl, $C_3$–$C_{20}$-Cycloalkyl, $C_6$–$C_{20}$-aryl, $C_7$–$C_{20}$-alkylaryl or $C_7$–$C_{20}$-arylalkyl radical, optionally containing heteroatoms belonging to groups 13–17 of the Periodic Table of the Elements; R' is a $C_1$–$C_{20}$-alkylidene, $C_6$–$C_{20}$-arylidene, $C_7$–$C_{20}$-alkylarylidene, or $C_7$–$C_{20}$-arylalkylidene radical; preferably X is a hydrogen atom, a halogen atom, a OR' or R group; more preferably X is chlorine or a methyl radical;

p is 1 or 2 being equal to the oxidation state of the metal M minus 2;

$R^1$ is a hydrogen atom or a linear or branched, saturated or unsaturated $C_1$–$C_{20}$-alkyl, $C_3$–$C_{20}$-Cycloalkyl, $C_6$–$C_{20}$-aryl, $C_7$–$C_{20}$-alkylaryl, or $C_7$–$C_{20}$-arylalkyl radical, optionally containing heteroatoms belonging to groups 13–17 of the Periodic Table of the Elements;

$R^2$ with $R^3$, and $R^4$ with $R^5$, form a 5 or 6 membered unsaturated rings, preferably said rings are aromatic, optionally said rings contain heteroatoms belonging to groups 13–16 of the Periodic Table of the Elements, and optionally said rings bear alkyl substituents, preferably said alkyl substituents are $C_1$–$C_{10}$-alkyl radicals;

$T^1$ is $C(R^6)_3$ or

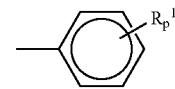

wherein R is a linear or branched, saturated or unsaturated $C_1$–$C_{20}$-alkyl, $C_3$–$C_{20}$-Cycloalkyl, $C_6$–$C_{20}$-aryl, $C_7$–$C_{20}$-alkylaryl, or $C_7$–$C_{20}$-arylalkyl radical, optionally containing heteroatoms belonging to groups 13–17 of the Periodic Table of the Elements; $p^1$ is an integer ranging from 0 to 5; $R^6$, equal to or different from each other, are hydrogen atoms or a linear or branched, saturated or unsaturated $C_1$–$C_{20}$-allyl, $C_3$–$C_{20}$-Cycloalkyl, $C_6$–$C_{20}$-aryl, $C_7$–$C_{20}$-alkylaryl, or $C_7$–$C_{20}$-arylalkyl radical, optionally containing heteroatoms belonging to groups 13–17 of the Periodic Table of the Elements; with the proviso that at least one $R^6$ is different from hydrogen atom;

$T^2$ is a hydrogen atom or a linear or branched, saturated or unsaturated $C_1$–$C_{20}$-alkyl, $C_3$–$C_{20}$-Cycloalkyl, $C_6$–$C_{20}$-aryl, $C_7$–$C_{20}$-alkylaryl, or $C_7$–$C_{20}$-arylalkyl radical, optionally containing heteroatoms belonging to groups 13–17 of the Periodic Table of the Elements;

or $T^1$ and $T^2$ can also join to form a saturated or unsaturated, condensed 5 or 6 membered ring optionally containing heteroatoms belonging to groups 13–16 of the Periodic Table of the Elements; said ring cam be substituted, preferably the substituents are $C_1$–$C_{20}$ alkyl groups optionally containing heteroatoms belonging to groups 13–16 of the Periodic Table of the Elements; to form for example a condensed benzene ring; a condensed thiophene ring; a condensed pyrrole ring;

L is a divalent bridging group selected from the group consisting of $CR^7_2$, $SiR^7_2$, $(CR^7_2)_2$ and $(SiR^7_2)_2$ radicals, wherein $R^7$, equal to or different from each other, are hydrogen atoms or a linear or branched, saturated or unsaturated $C_1$–$C_{20}$-alkyl, $C_3$–$C_{20}$-Cycloalkyl, $C_6$–$C_{20}$-aryl, $C_7$–$C_{20}$-alkylaryl, or $C_7$–$C_{20}$-arylalkyl radical, optionally containing heteroatoms belonging to groups 13–17 of the Periodic Table of the Elements; optionally two $R^7$ groups can also form an aliphatic ring having 3 to 8 atoms which can bear alkyl substituents, preferably said alkyl substituents are $C_1$–$C_{10}$-alkyl radicals; L is preferably $CR^7_2$ or $SiR^7_2$; preferably $R^7$ is a hydrogen atom or a methyl or phenyl radical; more preferably L is $Si(CH_3)_2$ or $C(CH_3)_2$;

(B) an alumoxane or a compound capable of forming an alkyl metallocene cation; and optionally (C) an organo aluminum compound.

Non limiting examples of rings formed by $R^2$ and $R^3$ or $R^4$ and $R^5$ are condensed benzene rings; condensed thiophene rings; and condensed pyrrole rings;

Preferred metallocene compounds of formula (I) belongs to the following three classes (1), (2) and (3) and have respectively formula (II), (M) and (IV).

Class (1)

Metallocene compounds belonging to class (1) have the following formula (II)

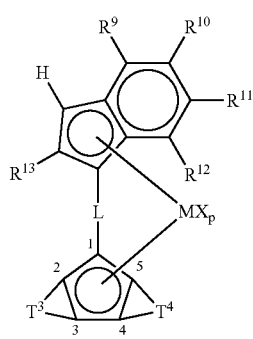

(II)

wherein:

L, M, X and p have the same meaning as described above;

$R^{13}$ is a hydrogen atom or a linear or branched, saturated or unsaturated $C_1$–$C_{20}$-alkyl, $C_3$–$C_{20}$-Cycloalkyl, $C_6$–$C_{20}$-aryl, $C_7$–$C_{20}$-alkylaryl, or $C_7$–$C_{20}$-arylalkyl radical, optionally containing heteroatoms belonging to groups 13–17 of the Periodic Table of the Elements; preferably $R^{13}$ is a linear or branched $C_1$–$C_{20}$ alkyl radical; more preferably $R^{13}$ is a methyl or an ethyl radical;

$R^9$, $R^{10}$, $R^{11}$ and $R^{12}$ are hydrogen atoms or linear or branched, saturated or unsaturated $C_1$–$C_{20}$-alkyl, $C_3$–$C_{20}$-Cycloalkyl, $C_6$–$C_{20}$-aryl, $C_7$–$C_{20}$-alkylaryl, or $C_7$–$C_{20}$-arylalkyl radicals, optionally containing heteroatoms belonging to groups 13–17 of the Periodic Table of the Elements; $R^9$, $R^{10}$, $R^{11}$ and $R^{12}$ can also form one or more 5 or 6 membered saturated or unsaturated rings optionally containing heteroatoms belonging to groups 13–16 of the Periodic Table of the Elements, said rings can bear alkyl substituents;

preferably $R^9$ is selected from the group consisting of $C_1$–$C_{20}$ alkyl and $C_6$–$C_{20}$ aryl radicals, even more preferably $R^9$ is a methyl, tertbutyl, isopropyl, phenyl, alkyl substituted phenyl radical; preferably said alkyl substituents are $C_1$–$C_{10}$-alkyl radicals; preferably $R^{10}$, $R^{11}$ and $R^{12}$ are hydrogen atoms;

$T^3$ and $T^4$ are moieties of formula (IIa) or (IIb):

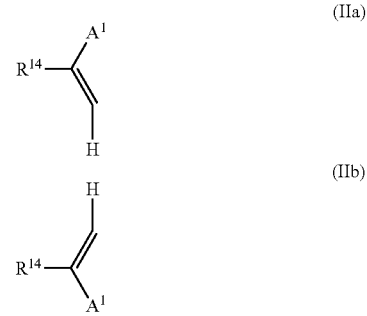

(IIa)

(IIb)

wherein:

when $T^3$ and $T^4$ are moieties of formula (IIa) $A^1$ bonds to the cyclopentadienyl group in position 2 and 5;

when $T^3$ and $T^4$ are moieties of formula (IIb) $A^1$ bonds to the cyclopentadienyl group in position 3 and 4;

$A^1$ is a sulphur atom (S), an oxygen atom (O), or a NR, PR, or $CR^{15}$ group; wherein R is a linear or branched, saturated or unsaturated $C_1$–$C_{20}$-alkyl, $C_3$–$C_{20}$-Cycloalkyl, $C_6$–$C_{20}$-aryl, $C_7$–$C_{20}$-alkylaryl, or $C_7$–$C_{20}$-arylalkyl radical, optionally containing heteroatoms belonging to groups 13–17 of the Periodic Table of the Elements; and $R^{15}$ is a hydrogen atom or a linear or branched, saturated or unsaturated $C_1$–$C_{20}$-alkyl, $C_3$–$C_{20}$-Cycloalkyl, $C_6$–$C_{20}$-aryl, $C_7$–$C_{20}$-alkylaryl, or $C_7$–$C_{20}$-arylalkyl radical, optionally containing heteroatoms belonging to groups 13–17 of the Periodic Table of the Elements; preferably in the moiety (IIa) $A^1$ is sulfur and in the moiety (IIb) $A^1$ is NR; preferably the group NR is N-methyl, N-ethyl or N-phenyl radical; preferably $R^{15}$ is a hydrogen atom;

$R^{14}$ is a hydrogen atom or a linear or branched, saturated or unsaturated $C_1$–$C_{20}$-alkyl, $C_3$–$C_{20}$-Cycloalkyl, $C_6$–$C_{20}$-aryl, $C_7$–$C_{20}$-alkylaryl, or $C_7$–$C_{20}$-arylalkyl radical, optionally containing heteroatoms belonging to groups 13–17 of the Periodic Table of the Elements;

preferably $R^{14}$ is a $C_1$–$C_{20}$ alkyl radical; more preferably $R^{14}$ is a methyl radical;

preferably $T^3$ and $T^4$ are moieties of formula (IIa);

preferred compounds of formula (II) has formula (IIc)

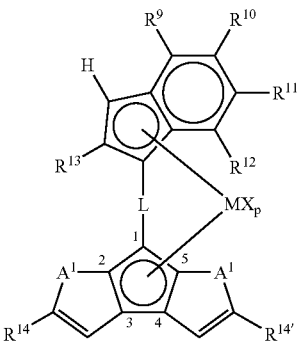

(IIc)

wherein $R^9$, $R^{10}$, $R^{11}$, $R^{12}$, $R^{13}$, $R^{14}$, $A^1$, L, M, X, and p have the same meaning as described above.

Class (2)

Metallocene compounds belonging to class (2) have the following formula (III)

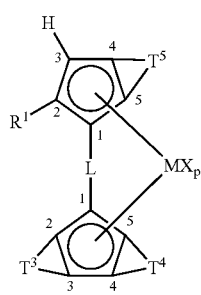

(III)

wherein:

$T^3$, $T^4$, $R^{13}$, M, X, p and L have the same meaning as described above;

$T^5$ is a moiety of formula (IIIa) or (IIIb)

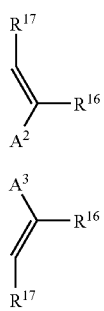

(IIIa)

(IIIb)

wherein:

in the moiety of formula (IIIa) $A^2$ bonds to the cyclopentadienyl group in position 5; in the moiety of formula (IIIb) $A^3$ bonds to the cyclopentadienyl group in position 4;

$A^2$ is a sulfur atom (S), an oxygen atom (O), or a $CR^{15}$ group; wherein $R^{15}$ is defined as above; preferably $A^2$ is a sulphur atom;

$R^{16}$ is a hydrogen atom or a linear or branched, saturated or unsaturated $C_1$–$C_{20}$-alkyl, $C_3$–$C_{20}$-Cycloalkyl, $C_6$–$C_{20}$-aryl, $C_7$–$C_{20}$-alkylaryl, or $C_7$–$C_{20}$-arylalkyl radical, optionally containing heteroatoms belonging to groups 13–17 of the Periodic Table of the Elements;

preferably $R^{16}$ is a $C_1$–$C_{20}$ alkyl radical; more preferably $R^{16}$ is a methyl radical;

$R^{17}$ is a linear or branched, saturated or unsaturated $C_1$–$C_{20}$-alkyl, $C_3$–$C_{20}$-Cycloalkyl, $C_6$–$C_{20}$-aryl, $C_7$–$C_{20}$-alkylaryl, or $C_7$–$C_{20}$-arylalkyl radical, optionally containing heteroatoms belonging to groups 13–17 of the Periodic Table of the Elements; $R^{17}$ and $R^{16}$ can also join to form a 5 or 6 membered aliphatic or aromatic ring; said ring can bear alkyl substituents, preferably said alkyl substituents are $C_1$–$C_{10}$-alkyl radicals;

preferably $R^{17}$ is a $C_1$–$C_{20}$ alkyl or $C_6$–$C_{20}$ alkylaryl radical; more preferably $R^{17}$ is phenyl radical substituted with one or more $C_1$–$C_{20}$ alkyl radical; preferably the substitution is in position 2 or 2 and 4 with respect to the phenyl ring;

$A^3$ is a NR group or a $CR^{15}$ group wherein R is a linear or branched, saturated or unsaturated $C_1$–$C_{20}$-alkyl, $C_3$–$C_{20}$-Cycloalkyl, $C_6$–$C_{20}$-aryl, $C_7$–$C_{20}$-alkylaryl, or $C_7$–$C_{20}$-arylalkyl radical, optionally containing heteroatoms belonging to groups 13–17 of the Periodic Table of the Elements; and $R^{15}$ is defined as above; preferably $A^3$ is a NR group; more preferably $A^3$ is a N-methyl or N-phenyl group.

Particularly preferred are those compounds wherein $T^5$ is a moiety of formula (IIIa) and $T^3$ and $T^4$ are moieties of formula (IIa) to form a compound of formula (IIIc)

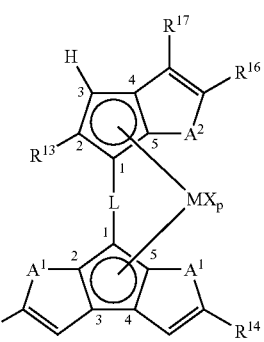

(IIIc)

wherein $R^{13}$, $R^{14}$, $R^{16}$, $R^{17}$, $A^1$, $A^2$, L, M, X, and p have been described above.

Class (3)

Metallocene compounds belonging to class (3) have the following formula (IV)

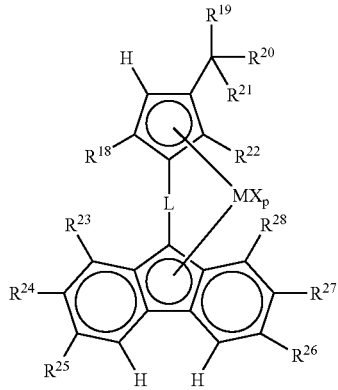

Wherein M, L, X and p have the same meaning as described above;

$R^{18}$, $R^{22}$, $R^{23}$, $R^{24}$, $R^{25}$, $R^{26}$, $R^{27}$ and $R^{28}$ are hydrogen atoms or a linear or branched, saturated or unsaturated $C_1$–$C_{20}$-alkyl, $C_3$–$C_{20}$-Cycloalkyl, $C_6$–$C_{20}$-aryl, $C_7$–$C_{20}$-alkylaryl, or $C_7$–$C_{20}$-arylalkyl radical, optionally containing heteroatoms belonging to groups 13–17 of the Periodic Table of the Elements; or two or more adjacent $R^{23}$, $R^{24}$, $R^{25}$, $R^{26}$, $R^{27}$, and $R^{28}$ can form one or more aliphatic or aromatic $C_4$–$C_8$ rings that can bear alkyl substituents, preferably said alkyl substituents are $C_1$–$C_{10}$-alkyl radicals;

$R^{19}$, $R^{20}$ and $R^{21}$ are hydrogen atoms or a linear or branched, saturated or unsaturated $C_1$–$C_{20}$-alkyl, $C_3$–$C_{20}$cycloalkyl, $C_6$–$C_{20}$-aryl, $C_7$–$C_{20}$-alkylaryl, or $C_7$–$C_{20}$-arylalkyl radical, optionally containing heteroatoms belonging to groups 13–17 of the Periodic Table of the Elements; with the proviso that at least one of $R^{19}$, $R^{20}$ and $R^{21}$ is different from a hydrogen atom;

Preferably in the compounds of formula (IV) $R^{22}$, $R^{23}$, $R^{24}$, $R^{25}$, $R^{26}$, $R^{27}$ and $R^{28}$ are hydrogen atoms; $R^{18}$ is a hydrogen atom or a $C_1$–$C_{20}$ alkyl radical; $R^{19}$, $R^{20}$, $R^{21}$ are a $C_1$–$C_{20}$ alkyl radical; more preferably they are methyl groups.

Metallocene compounds of formula (I) are well known in the art. In particular compounds of class (1) and (2) have been described in WO 01/47939; compounds belonging to class (3) have been described in EP 537 130.

Alumoxanes used as component B) can be obtained by reacting water with an organo-aluminium compound of formula $H_jAlU_{3-j}$ or $H_jAl_2U_{6-j}$, where U substituents, same or different, are hydrogen atoms, halogen atoms, $C_1$–$C_{20}$-alkyl, $C_3$–$C_{20}$-cyclalkyl, $C_6$–$C_{20}$-aryl, $C_7$–$C_{20}$-alkylaryl or or C7–C20-arylalkyl radical, optionally containing silicon or germanium atoms with the proviso that at least one U is different from halogen, and j ranges from 0 to 1, being also a non-integer number. In this reaction the molar ratio of Al/water is preferably comprised between 1:1 and 100:1.

The molar ratio between aluminium and the metal of the metallocene generally is comprised between about 10:1 and about 20000:1, and more preferably between about 100:1 and about 5000:1.

The alumoxanes used in the catalyst according to the invention are considered to be linear, branched or cyclic compounds containing at least one group of the type:

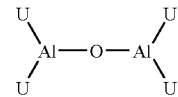

wherein the substituents U, same or different, are described above.

In particular, alumoxanes of the formula:

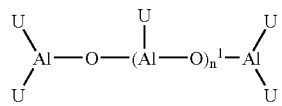

can be used in the case of linear compounds, wherein $n^1$ is 0 or an integer from 1 to 40 and the substituents U are defined as above, or alumoxanes of the formula:

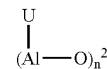

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4trimethyl-pentyl) alumoxane (TIOAO), tetra-(2,3-dimethylbutyl)alumoxane (TDMBAO) and tetra-(2,3,3-trimethylbutyl)alumoxane CACAO).

Particularly interesting cocatalysts are those described in WO 99/21899 and in WO01/21674 in which the alkyl and aryl groups have specific branched patterns.

Non-limiting examples of aluminium compounds according to WO 99/21899 and WO01/21674 are:

tris(2,3,3-trimethyl-butyl)aluminium, tris(2,3-dimethyl-hexyl)aluminium, tris(2,3-dimethyl-butyl)aluminium, tris (2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl) aluminium, tris(2-ethyl-3-methyl-butyl)aluminium, tris (2-ethyl-3-methyl-pentyl)aluminium, tris(2,3-diethyl-pentyl)aluminium, tris(2-propyl-3-methyl-butyl) aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris (2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluoro-phenyl)-propyl] aluminium, tris[2-(4–Chloro-phenyl)-propyl]aluminium, tris[2-(3-isopropyl-phenyl)-propyl]aluminium, tris(2-phenyl-butyl)aluminium, tris(3-methyl-2-phenyl-butyl) aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]

aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBAL), tris(2,4,4-trimethyl-pentyl)aluminium (TIOA), tris(2,3dimethylbutyl) aluminium (TDMBA) and tris(2,3,3-trimethylbutyl) aluminium IMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be able to be removed by an olefinic monomer. Preferably, the anion $E^-$ comprises of one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred examples of these compounds are described in WO 91/02012. Moreover, compounds of the formula $BAr_3$ can conveniently be used. Compounds of this type are described, for example, in the published International patent application WO 92/00333. Other examples of compounds able to form an alkylmetallocene cation are compounds of formula $BAr_3P$ wherein P is a substituted or unsubstituted pyrrol radicals. These compounds are described in WO01/62764. Other examples of cocatalyst can be found in EP 775707 and DE 19917985. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:61 and 2.1; more preferably about 1:1.

Non limiting examples of compounds of formula $D^+E^-$ are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammoniumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylaniliniumtetra(phenyl)borate,
N,N-Diethylaniliniumtetra(phenyl)borate,
N,N-Dimethylaniliniumtetrakis(pentafluorophenyl)boratee,
N,N-Dimethylaniliniumtetrakis(pentafluorophenyl)aluminate,
Di(propyl)ammoniumtetrakis(pentafluorophenyl)borate,
Di(cyclohexyl)ammoniumtetrais(pentafluorophenyl)borate,
Triphenylphosphoniumtetrakis(phenyl)borate,
Triethylphosphoniumtetrakis(phenyl)borate,
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate,
Triphenylcarbeniumtetrakis(phenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate,
N,N-Dimethylaniliniumtetrakis(pentafluorophenyl)borate.

Organic aluminum compounds used as compound C) are those of formula $H_jAlU_{3-j}$ or $H_jAl_2U_{6-j}$ described above.

The catalysts of the present invention can also be supported on an inert carrier. This is achieved by depositing the metallocene compound A) or the product of the reaction thereof with the component B), or the component B) and then the metallocene compound A) on an inert support such as, for example, silica, alumina, Al—Si, Al—Mg mixed oxides, magnesium halides, styrene/divinylbenzene copolymers, polyethylene or polypropylene. The supportation process is carried out in an inert solvent such as hydrocarbon for example toluene, hexane, pentane or propane and at a temperature ranging from 0° C. to 100° C., preferably the process is carried out at a temperature ranging from 25° C. to 90° C. or the process is carried out at room temperature.

A suitable class of supports which can be used is that constituted by porous organic supports functionalized with groups having active hydrogen atoms. Particularly suitable are those in which the organic support is a partially crosslinked styrene polymer. Supports of this type are described in European application EP-633272.

Another class of inert supports particularly suitable for use according to the invention is that of polyolefin porous prepolymers, particularly polyethylene.

A further suitable class of inert supports for use according to the invention is that of porous magnesium halides such as those described in International application WO 95/32995.

The solid compound thus obtained, in combination with the further addition of the alkylaluminium compound either as such or prereacted with water if necessary, can be usefully employed in the gas-phase polymerization.

With the process of the present invention it is possible to obtain a 1-butene polymer having high molecular weight and in high yields.

Another object of the present invention is a 1-butene homopolymer obtainable with the process of the present invention in particular when compounds of class 1 or 2 are used, having the following characteristics:
65>mm>100; preferably 75>mm>100; even more preferably 80>mm>100;
intrinsic viscosity (I.V.)>0.45; preferably ≧0.5; more preferably >0.7.
4,1 insertions (regioerrors)<0.19%; preferably <0.1%;
an extractable content in boiling diethylether <2%; preferably <1%.

Preferably the 1-butene homopolymer of the present invention does not have 4,1 insertions (regioerrors) detectable with a 400 MHz spectrometer operating at 100.61 MHz. Preferably the 1-butene homopolymer of the present invention has isotactic pentads (mmmm)≧90% more preferably≧93%.

More preferably the 1-butene homopolymer of the present invention does not have extractable content in boiling diethylether.

Furthermore the 1-butene homopolymer object of the present invention satisfies the following formula:

(mmmm)>90−2×rr wherein
mmmm is the value of the isotactic pentads and rr is the value of the syndiotactic triads calculated with 400 MHz spectrometer operating at 100.61 MHz.

Furthermore the 1-butene homopolymers of the present invention are endowed with a flexural modulus value (ASTM D-790) comprised between 150 and 300 Mpa. This value of the modulus in conjunction with the relatively high melting point render the 1-butene homopolymers of the present invention useful for advantageously replacing the 1-butene copolymers that at equivalent melting point show a lower flexural modulus.

The polymerization process of the present invention can be carried out in liquid phase, optionally in the presence of an inert hydrocarbon solvent, or in gas phase. Said hydrocarbon solvent can be either aromatic (such as toluene) or aliphatic (such as propane, hexane, heptane, isobutane, cyclohexane and 2,2,4-trimethylpentane).

The polymerization temperature preferably ranges from 0° C. to 250° C.; preferably comprised between 20° C. and 150° C. and, more particularly between 40° C. and 90° C.

Generally, the polymers of the present invention are endowed with a narrow molecular weight distribution. The molecular weight distribution is represented by the ratio $M_w/M_n$ which, for the polymers of the present invention, when the metallocene used is a pure isomer, is generally lower than 4, preferably lower than 3.5 and, more preferably, lower than 3.

The molecular weight distribution can be varied by using mixtures of different metallocene compounds or by carrying out the polymerization in several stages which differ as to the polymerization temperature and/or the concentrations of the molecular weight regulators and/or the monomers concentration. Moreover by carrying out the polymerization process by using a combination of two different metallocene compounds of formula (I) a polymer endowed with a broad melting is produced.

The polymerization yield depends on the purity of the transition metal organometallic catalyst compound (A) in the catalyst, therefore, said compound can be used as such or can be subjected to purification treatments before use.

The following examples are for illustrative purpose and do not intend to limit the scope of the invention.

EXAMPLES

Experimental Section

The intrinsic viscosity (I.V.) was measured in tetrahydronaphtalene (THN) at 135° C.

The melting points of the polymers ($T_m$) were measured by Differential Scanning Calorimetry (D.S.C.) on an Perkin Elmer DSC-7 instrument, according to the standard method. A weighted sample (5–10 mg) obtained from the polymerization was sealed into aluminum pans and heated at 200° C. with a scanning speed corresponding to 20° C./minute. The sample was kept at 200° C. for 5 minutes to allow a complete melting of all the crystallites. Successively, after cooling to 0° C. with a scanning speed corresponding to 20° C./minute, the peak temperature was taken as crystallization temperature ($T_c$). After standing 5 minutes at 0° C., the sample was heated for the second time at 200° C. with a scanning speed corresponding to 20° C./min. In this second heating run, the peak temperature was taken as the melting temperature ($T_m$) and the area as global melting enthalpy ($\Delta H_f$).

The molecular weight distribution was determined on a WATERS 150 C using the following chromatographic conditions:

| Columns: | 3x SHODEX AT 806 MS; 1x SHODEX UT 807; 1x SHODEX AT-G; |
|---|---|
| Solvent: | 1,2,4 trichlorobenzene (+0.025% 2,6-Di-tert.Butyl-4-Methyl-Phenol); |
| Flow rate: | 0.6–1 ml/min; |
| Temperature: | 135° C.; |
| Detector: | INFRARED AT λ ≅ 3.5 μm; |
| Calibration: | Universal Calibration with PS-Standards. |

$^{13}$C-NMR spectra were acquired on a DPX-400 spectrometer operating at 100.61 MHz in the Fourier transform mode at 120° C. The peak of the 2B$_2$ carbon (nomenclature according to Carrnan, C. J.; Harrington, R. A.; Wilkes, C. E. *Macromolecules* 1977, 10, 535) was used as internal reference at 27.73. The samples were dissolved in 1,1,2,2-tetrachloroethane-d2 at 120° C. with a 8% wt/v concentration. Each spectrum was acquired with a 90° pulse, 15 seconds of delay between pulses and CPD (waltz16) to remove 1H-13C coupling. About 3000 transients were stored in 32K data points using a spectral window of 6000 Hz. Assignments of 4,1 insertion were made according to Busico (V. Busico, R. Cipullo, A. Borriello, *Macromol. Rapid. Commun.* 1995, 16, 269–274)

The content of 4,1 insertions was calculated as follows:
4,1 units=0.5×I$_4$×100/(I$_2$+I$_4$)

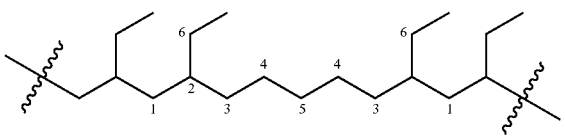

4,1-sequence

Preparation of Catalyst Components isopropylidene(3-tertbutyl-1-Cyclopentadienyl)(9-fluorenyl)zirconium dichloride (A-1) was prepared according to EP 537130. Dimethylsilyl{(1-indenyl)-7-(2,5-dimethyl-cyclopenta[1,2-b:4,3-b']-dithiophene)}zirconium dichloride (A-2); dimethylsilyl{(2-methyl-1-indenyl)-7-(2,5-dimethyl-cyclopenta[1,2-b:4,3-b']-dithiophene)}zirconium dichloride (A-3) and dimethylsilyl{(2-methylcyclopenta[a]naphthalene)-7-(2,5-dimethylcyclopenta[1,2-b:4,3-b ']-dithiophene)}zirconium dichloride (A-4)were prepared according to PCT/EP00/13191. rac dimethylsilylbis(2-methyl-4-phenyl-indenyl)zirconium dichloride (A-5) was prepared according to U.S. Pat. No. 5,786,432. rac dimethylsilylbis(2-methyl4–5-benzoindenyl)zirconium dichloride (A-6) was prepared according to U.S. Pat. No. 5,932,669.

The cocatalyst methylalumoxane (MAO) was a commercial product which was used as received (Witco A G, 10% wt/vol toluene solution, 1.7 M in Al).

POLYMERIZATION EXAMPLES 1–4 AND COMPARATIVE EXAMPLES 5–6

The cocatalyst methylalumoxane (MAO) was a commercial product which was used as received (Witco AG, 10% wt/vol toluene solution, 1.7 M in Al). The catalyst mixture was prepared by dissolving the desired amount of the metallocene with the proper amount of the MAO solution, (Al/Zr ratio=1000) obtaining a solution which was stirred for 10 min at ambient temperature before being injected into the autoclave.

Polymerization (General Procedure)

4 mmol of Al(i-Bu)$_3$ (as a 1M solution in hexane) and 712 g of 1-butene were charged at room temperature in a 2.5-L jacketed stainless-steel autoclave, equipped with magnetically driven stirrer and a 35-mL stainless-steel vial, connected to a thermostat for temperature control, previously purified by washing with an Al(i-Bu)$_3$ solution in hexanes and dried at 50° C. in a stream of nitrogen. The autoclave was then thermostatted at the polymerization temperature, and then the toluene solution containing the catalyst/cocatalyst mixture was injected in the autoclave by means of nitrogen pressure through the stainless-steel vial, and the polymerization carried out at constant temperature for 1 hour. The polymerization was stopped by pressurizing CO into the reactor. After venting the unreacted monomer and cooling the reactor to room temperature, the polymer was dried under reduced pressure at 60° C.

The polymerization conditions and the characterization data of the obtained polymers are reported in Table 1

Diethyl Ether Solubles

Samples of 5 g of 1-butene polymer obtained according to polymerization examples 1–4 was subjected to Soxhlet extraction with diethyl ether for 6 hours. The extracts was evaporated. No residues of polymer were found.

CHARACTERIZATION OF THE POLYMER OBTAINED IN EXAMPLE 3

Samples of polymer obtained from example 3 and a 1-butene ethylene copolymer (4.7% by mol of ethylene content) sold by Basell (grade DP—8310) were ground in an electric mill with liquid nitrogen in order to achieve the right size to feed them in a Brabender® mixer chamber. The ground samples were mixed in a Brabender® chamber with 1% 2,6-di-t-butyl-4-methyl phenol (BHT) at 200° C. and then transformed in a 4.0 mm thick plaques through compression molding at 200° C.

The 4.0 mm thick plaques were submitted to the flexural modulus determination according to ISO 178 method. The results are reported in table 2. From table 2 clearly results that the commercial copolymer has the same melting point of the polymer obtained in example 3 but a considerably lower Flexural modulus.

alpha olefin of formula CH$_2$=CHT wherein T is a C$_3$–C$_{10}$ alkyl group, and (ii) a catalyst system obtained by contacting:

(A) a metallocene compound comprising formula (II):

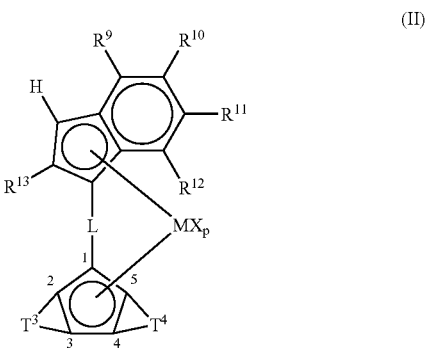

wherein

R13 is a linear or branched C$_1$–C$_{20}$ alkyl radical;

R$^9$ is a C$_2$–C$_{20}$ alkyl or C$_6$–C$_{20}$ aryl radical;

R$^{10}$, R$^{11}$ and R$^{12}$ are hydrogen,

T$^3$ and T$^4$ are moieties of formula (IIa) or (IIb):

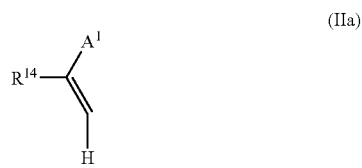

TABLE 1

| Ex | metall | mg | Al$_{(MAO)}$/Zr | T$_{pol}$ | t (min) | Yield (g) | Activity Kg/(g$_{cat}$·h) | I.V. (dL/g) | M$_w$/M$_n$ | T$_m$ (II) ° C. | (II) J/g | mmmm | mm | mmrr + mmmr | rr | 90-2rr | regioerrors 4,1 insertions |
|---|---|---|---|---|---|---|---|---|---|---|---|---|---|---|---|---|---|
| 1 | A-1 | 4 | 1000 | 60 | 30 | 46.4 | 23.2 | 0.5 | n.a. | 100 | 33 | 98 | 98.7 | 0.9 | 0 | 90 | n.d. |
| 2 | A-2 | 4 | 1000 | 60 | 15 | 79.4 | 79.4 | 0.5 | 2.25 | 67 | 36 | 86 | 91.3 | 5.8 | 2.9 | 84.2 | n.d. |
| 3 | A-3 | 4 | 1000 | 60 | 60 | 249.4 | 62.4 | 0.9 | 2.13 | 77 | 13 | 87 | 92.2 | 5.2 | 2.6 | 84.8 | n.d. |
| 4 | A-4 | 4 | 1000 | 60 | 30 | 108.5 | 54.2 | 0.8 | 2.56 | 91 | 27 | 94 | 96.6 | 2.2 | 1.1 | 87.8 | n.d. |
| 5* | A-5 | 4 | 1000 | 60 | 30 | 39.5 | 9.9 | 0.9 | 2.12 | 105 | 33 | n.a. | ≈100 | n.a. | n.a. | n.a. | 0.4 |
| 6* | A-6 | 4 | 1000 | 60 | 60 | 17.5 | 4.4 | 1.1 | n.a. | n.a. | n.a. | n.a. | 99.2 | n.a. | n.a. | n.a. | 1 |

*comparative; n.d. = not detectable; n.a. = not available

TABLE 2

| Property | DP-8310 | Example 3 |
|---|---|---|
| T$_m$(II) (° C.) | 83.8 | 84.1 |
| M$_w$/M$_n$ | 5.0. | 2.13 |
| I.V. (dL/g) | 1.50 | 0.9 |
| Flexural modulus (Mpa) | 73 | 250 |

-continued

The invention claimed is:

1. A process for polyrnerizing 1-butene comprising contacting under polymerization conditions (i) 1-butene, optionally from 0 to 30% by mole of ethylene, propylene or an alpha olefin of formula CH$_2$=CHT wherein T is a C$_3$–C$_{10}$ wherein when T$^3$ and T$^4$ are moieties of formula (IIa), A$^1$ bonds to the cyclopentadienyl group in position 2 and 5;

when $T^3$ and $T^4$ are moieties of formula (IIb), $A^1$ bonds to the cyclopentadienyl group in position 3 and 4;

$A^1$ is sulfur in the moiety (IIa);

$A^1$ is NR in the moiety (IIb);

x, equal to or different from each other, is hydrogen, a halogen, R, OR, OR'O, $OSO_2CF_3$, OCOR, SR, $NR_2$ or $PR_2$;

R is a linear or branched, saturated or unsaturated $C_1$–$C_{20}$-alkyl, $C_3$–$C_{20}$-cycloalkyl, $C_6$–$C_{20}$-aryl, $C_7$–$C_{20}$-alkylaryl, or $C_7$–$C_{20}$-arylalkyl radical, optionally containing heteroatoms belonging to groups 13–17 of the Periodic Table of Elements;

R' is a $C_1$–$C_{20}$-alkylidene, $C_6$–$C_{20}$-arylidene, $C_7$–$C_{20}$-alkylarylidene, or $C_7$–$C_{20}$-arylalkylidene radical;

L is a divalent bridging group selected from the group consisting of $CR^7_2$, $SiR^7_2$, $(CR^7_2)_2$ and $(SiR^7_2)_2$ radicals;

$R^7$, equal to or different from each other, is hydrogen or a linear or branched, saturated or unsaturated $C_1$–$C_{20}$-alkyl, $C_3$–$C_{20}$-cycloalkyl, $C_6$–$C_{20}$-aryl, $C_7$–$C_{20}$-alkylaryl, or $C_7$–$C_{20}$-arylalkyl radical, optionally containing heteroatoms belonging to groups 13–17 of the Periodic Table of Elements, with two $R^7$ groups optionally forming an aliphatic ring having 3 to 8 atoms which can have at least one alkyl substituent;

M is a transition metal selected from those belonging to group 3, 4, or a lanthanide or actinide group in the Periodic Table of Elements (new IUPAC version);

p is 1 or 2 and is equal to an oxidation state of M minus 2;

$R^{14}$ is a $C_1$–$C_{20}$ alkyl radical; with (B) an alumoxane and/or a compound that forms an alkyl metallocene cation thereby forming a polymerized product, the polymerized product comprising:

65>mm>100;

an intrinsic viscosity greater than about 0.45;

4,1 insertions less than about 0.19%; and an extractable content in boiling diether of less than about 2%.

2. The process according to claim 1, wherein the catalyst system is obtained by further contacting (A) and (B) with (C) an organo aluminum compound.

3. The process according to claim 1, wherein

L is $CR^7_2$ or $SiR^7_2$;

$R^7$ is hydrogen or a methyl or phenyl radical;

M is zirconium or hafnium;

X is hydrogen, a halogen, OR'O, or R;

R is a linear or branched or saturated or unsaturated $C_1$–$C_{20}$-alkyl, $C_3$–$C_{20}$-cycloalkyl, $C_6$–$C_{20}$-aryl, $C_7$–$C_{20}$-alkylaryl, or $C_7$–$C_{20}$-arylalkyl radical, optionally containing heteroatoms belonging to groups 13–17 of the Periodic Table of Elements; and R' is a divalent radical selected from the group consisting of $C_1$–$C_{20}$-alkylidene, $C_6$–$C_{20}$-arylidene, $C_7$–$C_{20}$-alkylarylidene, and $C_7$–$C_{20}$-arylalkylidene radicals.

4. The process according to claim 1, wherein the metallocene compound has formula (IIc):

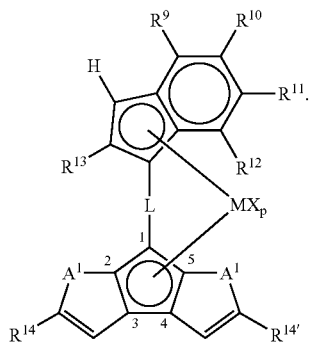

(IIc)

5. The process according to claim 1, wherein the alkyl substituent of the aliphatic ring having 3 to 8 atoms is a $C_1$–$C_{10}$-alkyl.

6. The process of claim 1, wherein the polymerized product is a 1-butene homopolymer.

7. A process for polymerizing 1-butene comprising contacting under polymerization conditions (i) 1-butene, optionally from 0 to 30% by mole of ethylene, propylene or an alpha olefin of formula $CH_2=CHT$ wherein T is a $C_3$–$C_{10}$ alkyl group, and (ii) a catalyst system obtained by contacting:

(A) a metallocene compound comprising formula (III):

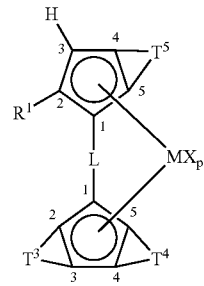

(III)

wherein $R^{13}$ is hydrogen or a linear or branched, saturated or unsaturated $C_1$–$C_{20}$-alkyl, $C_3$–$C_{20}$-cycloalkyl, $C_6$–$C_{20}$aryl, $C_7$–$C_{20}$-alkylaryl or $C_7$–$C_{20}$-arylalkyl radical, optionally containing heteroatouw belonging to groups 13–17 of the Periodic Table of Elements;

$T^3$ and $T^4$ are moieties of formula (IIa) or (IIb):

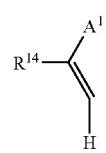

(IIa)

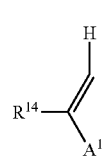

(IIb)

wherein when T³ and T⁴ are moieties of formula (IIa), A¹ bonds to the cyclopentadienyl group in position 2 and 5;

when T³ and T⁴ are moieties of formula (IIb), A¹ bonds to the cyclopentadienyl group in position 3 and 4;

A¹ is sulphur, oxygen, NR, PR, or $CR^{15}$;

R is a linear or branched, saturated or unsaturated $C_1-C_{20}$-alkyl, $C_1-C_{20}$-cycloalkyl, $C_6-C_{20}$-aryl, $C_7-C_{20}$-alkylaryl, or $C_7-C_{20}$-arylalkyl radical, optionally containing heteroatoms belonging to groups 13–17 of the Periodic Table of Elements;

$R^{14}$ is hydrogen or a linear or branched, saturated or unsaturated $C_1-C_{20}$-alkyl, $C_3-C_{20}$-cycloalkyl, $C_6-C_{20}$-aryl, $C_7-C_{20}$-alkylaryl, or $C_7-C_{20}$-arylalkyl radical, optionally containing heteroatoms belonging to groups 13–17 of the Periodic Table of Elements;

T⁵ is a moiety of formula (IIIa) or (IIIb)

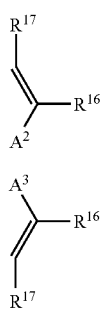

(IIIa)

(IIIb)

wherein

A² bonds to the cyclopentadienyl group in position 5 in the moiety of formula (IIIa);

A³ bonds to the cyclopentadienyl group in position 4 in the moiety of formula (IIIb);

A² is sulphur, oxygen, or $CR^{15}$;

$R^{15}$ is hydrogen or a linear or branched, saturated or unsaturated $C_1-C_{20}$-alkyl, $C_3-C_{20}$-cycloalkyl, $C_6-C_{20}$-aryl, $C_7-C_{20}$-alkylaryl, or $C_7-C_{20}$-arylalkyl radical, optionally containing heteroatoms belonging to groups 13–17 of the Periodic Table of Elements;

$R^{16}$ is hydrogen or a linear or branched, saturated or unsaturated $C_1-C_{20}$-alkyl, $C_3-C_{20}$-cycloalkyl, $C_6-C_{20}$-aryl, $C_7-C_{20}$-alkylaryl, or $C_7-C_{20}$-arylalkyl radical, optionally containing heteroatoms belonging to groups 13–17 of the Periodic Table of Elements;

R17 is hydrogen or a linear or branched, saturated or unsaturated $C_1-C_{20}$-alkyl, $C_3-C_{20}$-cycloalkyl, $C_6-C_{20}$-aryl, $C_7-C_{20}$-alkylaryl, or $C_7-C_{20}$-arylalkyl radical, optionally containing heteroatoms belonging to groups 13–17 of the Periodic Table of Elements, $R^{17}$ and $R^{16}$ can optinally join to form a 5 or 6 membered aliphatic or aromatic ring, wherein the 5 or 6 membered aliphatic or aromatic ring can have at least one alkyl substituent;

A³ is NR or $CR^{15}$, wherein R is a linear or branched, saturated or unsaturated $C_1-C_{20}$-alkyl, $C_3-C_{20}$-cycloalkyl, $C_6-C_{20}$-aryl, $C_7-C_{20}$-alkylaryl, or $C_7-C_{20}$-arylalkyl radical, optionally containing heteroatoms belonging to groups 13–17 of the Periodic Table of Elements; with (B) an alumoxane and/or a compound that forms an alkyl metallocene cation thereby forming a polymerized product, the polymerized product comprising:

65>mm>100;

an intrinsic viscosity greater than about 0.45;

4,1 insertions less than about 0.19%; and an extractable content in boiling diether of less than about 2%.

8. The process according to claim 7, wherein $R^{16}$ is a $C_1-C_{20}$ alkyl radical;

$R^{17}$ is a $C_1-C_{20}$alkyl or a $C_6-C_{20}$ alkylaryl radical;

A² is sulfur;

A³ is NR;

R is a linear or branched, saturated or unsaturated $C_1-C_{20}$-alkyl, $C_3-C_{20}$-cycloalkyl, $C_6-C_{20}$-aryl, $C_7-C_{20}$-alkylaryl, or $C_7-C_{20}$-arylalkyl radical, optionally containing heteroatoms belonging to groups 13–17 of the Periodic Table of Elements.

9. The process according to claim 7, wherein the metallocene compound has formula (IIIc):

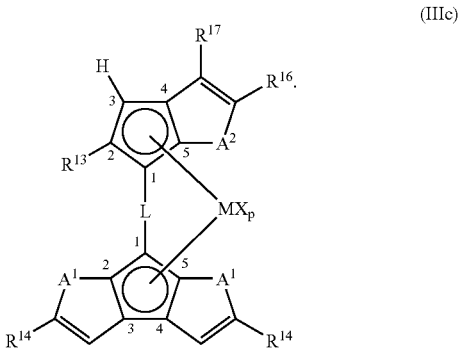

(IIIc)

10. The process according to claim 7, wherein $R^{17}$ and $R^{16}$ join to form a 5 or 6 membered aliphatic or aromatic ring, wherein the 5 or 6 membered aliphatic or aromatic ring has at least one $C_1-C_{10}$-alkyl substituent.

11. A 1-butane homopolymer having the following characteristics:

(mmmm)>90−2×rr;

intrinsic viscosity (I.V.)>0.45;

4,1 insertions (regioerrors)<0.19%; and an extractable content in boiling diethylether <2%;

wherein mmmm is a value of isotactic pentads and rr is a value of syndiotactic triads.

12. The 1-butane homopolymer according to claim 11, comprising a flexural modulus value (ASTM D-790) between 150 and 300 MPa.

13. A 1-butane homopolymer having the following characteristics:

isotactic pentads (mmmm)≧90%;

intrinsic viscosity (I.V.)>0.45;

4,1 insertions (regioerrors)<0.19%; and an extractable content in boiling diethylether <2%.

14. The 1-butene homopolymer according to claim 13 comprising a flexural modulus value (ASTM D-790) between 150 and 300 MPa.

* * * * *

UNITED STATES PATENT AND TRADEMARK OFFICE
CERTIFICATE OF CORRECTION

PATENT NO. : 7,166,683 B2  
APPLICATION NO. : 10/495298  
DATED : January 23, 2007  
INVENTOR(S) : Luigi Resconi It is certified that error appears in the above-identified patent and that said Letters Patent is hereby corrected as shown below:

At col. 14, line 25, delete "$C_2$-$C_{20}$" and insert instead --$C_1$-$C_{20}$--

At col. 16, line 49, delete "heteroatouw" and insert instead --heteroatoms--

At col. 18, line 53, delete "1-butane" and insert instead --1-butene--

Signed and Sealed this

Twenty-third Day of December, 2008

JON W. DUDAS  
*Director of the United States Patent and Trademark Office*